United States Patent [19]

Cannon

[11] 4,126,821
[45] Nov. 21, 1978

[54] STEPPING MOTOR CONTROL CIRCUIT

[75] Inventor: Lee E. Cannon, Bozeman, Mont.

[73] Assignee: Dana Corporation, Toledo, Ohio

[21] Appl. No.: 731,867

[22] Filed: Oct. 13, 1976

[51] Int. Cl.² .......................................... G05B 19/40
[52] U.S. Cl. ..................................... 318/696; 328/34; 307/271
[58] Field of Search ............... 318/696, 685, 138, 254, 318/415; 328/34, 41, 44, 74; 307/271, 225; 235/151.11

[56] References Cited
U.S. PATENT DOCUMENTS

| 3,805,138 | 4/1974 | Hilker | 318/685 |
| 3,806,821 | 4/1974 | Niemeyer et al. | 318/685 |
| 3,818,261 | 6/1974 | Clarke, Jr. | 318/685 |

Primary Examiner—Herman J. Hohauser
Attorney, Agent, or Firm—Robert E. Pollock

[57] ABSTRACT

Disclosed is a stepping motor control utilizing a microprocessor. The control is suitable for driving one or more stepping motors one at a time or in unison. In the illustrated embodiment when plural motors are driven together they are driven at the same rate or at rates in a fixed proportion to one another although several of the features of the invention are suitable for use in circuits providing contouring control; i.e., where separate motors are driven at separate stepping rates proportional to the relative distances each is to traverse for a single movement. An acceleration/deceleration circuit is utilized which provides simple yet highly accurate and efficient control of the stepping motors. Feed rate compensation for simultaneous drive of two motors is provided. Also a means is provided to allow stepping rates in excess of the counting rate capability of the microprocessor.

11 Claims, 4 Drawing Figures

STEPPING MOTOR CONTROL CIRCUIT

BACKGROUND OF THE INVENTION

This invention relates to numerical control systems for driving stepping motors and more particularly to novel acceleration and rate controls therefor.

Stepping motors have long been used to provide extremely accurate speed and particularly position control. Within the limits of system dynamics a stepping motor increments one step each time a pulse controlled change of polarity is applied to its windings. The steps are typically 1/200 or 1/400 of a revolution per step and such low angular increments coupled with a low pitch lead screw results in position changes of the driven element as low as 0.0001 inches per step. Driving a stepping motor at steady state is not difficult and requires only an oscillator with the desired frequency.

In many applications, for instance machine tools, substantial masses must be driven with extreme positioning accuracy. Frequently the desired velocity of the driven member is such that the stepping motor must accelerate gradually over several hundred or thousand steps to avoid slipping and losing absolute synchronization with the driver. Deceleration, which is simply negative acceleration (the term acceleration being used herein to denote both positive and negative acceleration in many cases), also requires careful control for the same reason.

Several schemes have been used heretofore for acceleration control. These schemes are generally suboptional. The simple schemes such as linear acceleration do not provide optimum equipment performance. The rate of acceleration with such a scheme must be fixed to allow the system to follow under the worst case conditions. Consequently the full power of the stepping motor is not utilized over much of the acceleration range. This results in appreciably slower average speeds, particularly with short incremental moves.

More sophisticated control regimens have heretofore required very complex controls and in many cases have still failed to provide the optimum utilization of the motor/driven machinery combination.

In many applications it is desirable to drive two or more stepping motors simultaneously. There are two general ways to accomplish this. One is to drive each stepping motor separately and control each at the desired rate. An example of such an arrangement is shown in U.S. Pat. No. 3,069,608. Alternatively, the motors can be driven by the same controls at the same rate. When applied to a system wherein the two motors are driving a member respectively along two axes at right angles to one another, for instance an X-Y table, this allows a single step to be taken along either axis or a 45° step to be taken when both motors are simultaneously stepped.

The single drive approach is considerably simpler and less expensive. It has limitations, however, and has not been widely accepted for machine tool applications as a consequence. One important limitation relates to maximum feed rate control in applications such as machine tools. When operating both motors simultaneously and therefore operating at a 45° angle the resultant movement, for a constant X and Y stepping rate is $\sqrt{2}$, or approximately 1.4 times the velocity of an X only or Y only step. Since surface finish and tool life suffer at high feed rates and production suffers at low rates no fixed X and Y rate is fully satisfactory for a machine having the capability of simultaneously moving in both directions. Some highly sophisticated controls utilizing separate drivers for plural motors also include calculating means to alter the feed rate along each axis based on the angle of movement and the resultant velocity. While providing a highly satisfactory control, such an approach is relatively cumbersome and expensive.

Recently the availability of moderately priced microprocessors has generated interest in their utilization in a variety of applications. Such devices are of interest for numerical control equipment but have limitations which pose problems to their efficient use in such applications. One such problem is that the resolution of stepping motors is so high that storage and counting of the number of pulses (steps) for a particular move involves the handling of very large numbers at very high speeds. These rates are frequently so high that they exceed the capacity of the microprocessor. Consequently microprocessors cannot be used with conventional design in some applications and, when usable, limit or tend to limit the stepping rates available.

It is an object of this invention to provide a simple, accurate and highly hardware efficient control for stepping motors including acceleration control.

It is another object of this invention to provide a simple means of rate control to maintain constant velocity movement while using a single driver to drive two motors individually or simultaneously.

It is a further object of this invention to provide a means to minimize the effect of large step storage data requirements on the size of a microcomputer used in calculating step position information.

The above and other objects are efficiently achieved by the novel circuit design disclosed herein.

SUMMARY OF THE INVENTION

In accordance with one aspect of the present invention an executive control circuit is provided which utilizes two counters in a novel way to control position and acceleration. The first counter is intially set to indicate the total number of pulses (steps) required to affect the desired incremental move. The second counter is an up/down counter and is used primarily to control acceleration. It is at zero at the start of any move. During positive acceleration the first counter is decremented two steps for each step of the motor and the second counter is incremented one step for each step of the motor. Thus the second counter registers the number of steps into the acceleration, which is directly (although preferably non-linearly) related to the stepping rate, at any given time and the sum of the count in the two counters indicates the total number of steps remaining in the move.

During non-accelerating operation the first counter is counted down to zero by one step for each step of the motor and the second counter is unchanged to retain a current stepping rate control. The sum of the counts in the two counters still indicates the total number of steps remaining in the move.

During negative acceleration the second counter is decremented one step for each step taken by the motor and the first counter is unchanged. Again the first counter contains a velocity related count and the sum of the counts in the two counters indicates the number of steps remaining in the move.

When the count in the first counter reaches zero the system decelerates for the number of steps indicated by the second counter. When the second counter reaches zero the move is complete.

In accordance with another aspect of the invention a means is provided to control the rate of the motor driving pulses depending on the number of motors being driven by a single driver. A command is generated to indicate whether one or two axis movement is to be affected and the command is used to program a programmable divider to change the pulse rate by a factor of approximately 1.4. The programmable divider is interposed between the oscillator providing the maximum feed rate signal and the motor control pulse generating signal.

In accordance with another aspect of the invention a microprocessor is provided with a limited rate of calculating speed. An external count down counter is provided, typically of one or two decimal digits capacity. The lowest order digits are stored in the external counter and the high order digits are stored in the microprocessor. Pulses to be counted are fed to the external counter to count it down. The external counter is of the type which counts down through zero. Each time it reaches zero it provides a pulse to the microprocessor which counts the higher order digits. A means is provided to determine when the count in the microprocessor has been reached and the external counter is at zero to determine the end of the count. The down counter can be conventional or can count down by incrementing the complement of the number stored.

BRIEF DESCRIPTION OF THE DRAWINGS

The best mode contemplated of practicing the invention is illustrated in the accompanying drawings in which.

DESCRIPTION OF THE PREFERRED EMBODIMENT

Figure 1:
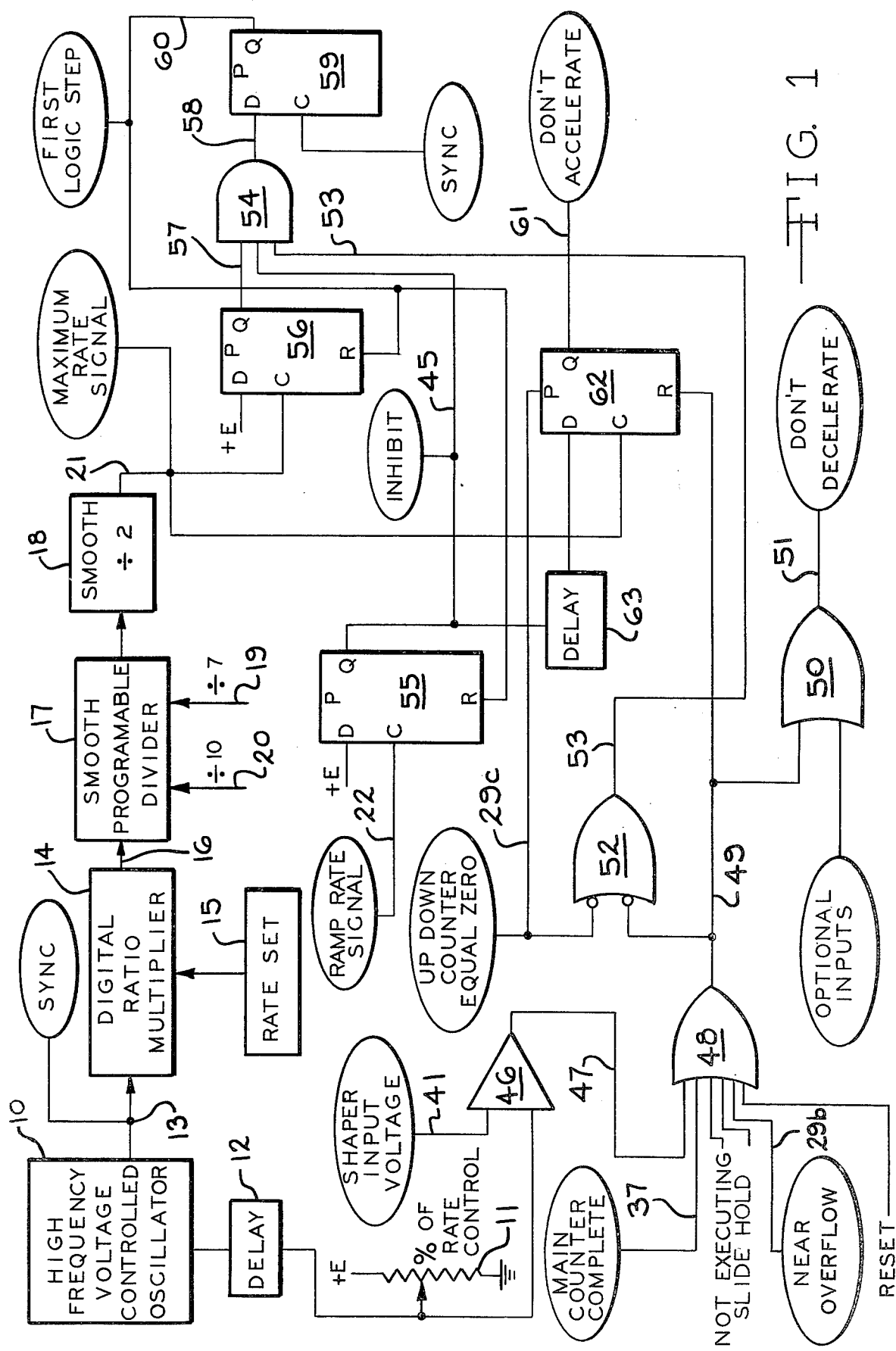
FIGS. 1 and 2, collectively, are a schematic representation, partially in block diagram form, of the overall circuit of the present invention.
Figure 2:
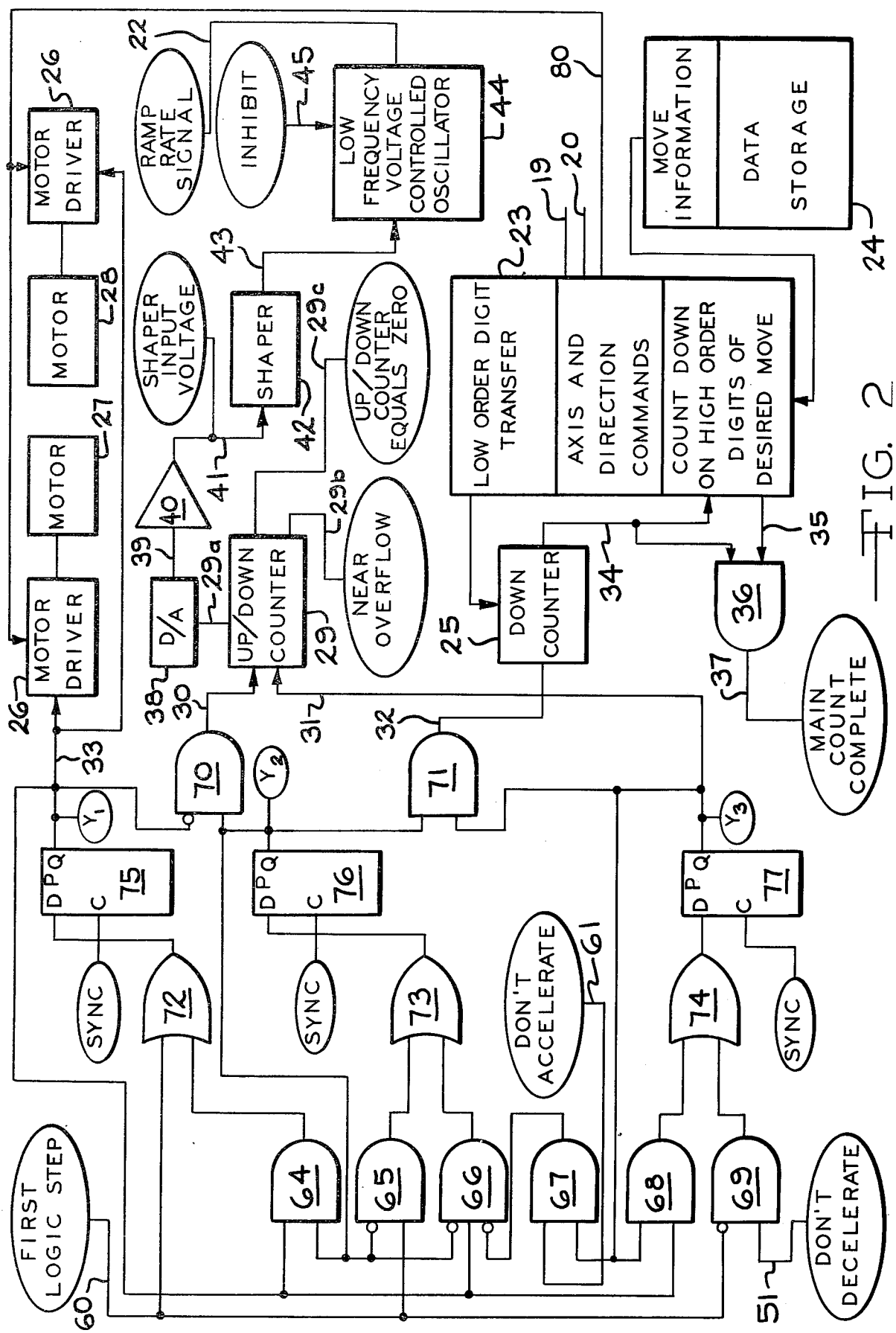

FIGS. 1 and 2 collectively show the overall circuitry of the invention. The operation of the circuit as described and claimed can be implemented in many forms of specific components and circuits depending on the desires of the designer and not material to the utility of the invention. Because of this and for ease of explanation and understanding much of the circuit is shown in block diagram or generalized form showing such detail as is necessary for a full understanding and to allow ready use of the invention.

In general terms the circuit includes two oscillators. One operates at high frequency and provides the principal system speed and synchronization. The second typically operates at lower frequency and provides a means of controlling the acceleration of the stepping motor in a controlled manner. A logic means is provided to determine when the motor should be pulsed (stepped) depending on the speed of the motor and its point within the movement specified.

Figure 4:
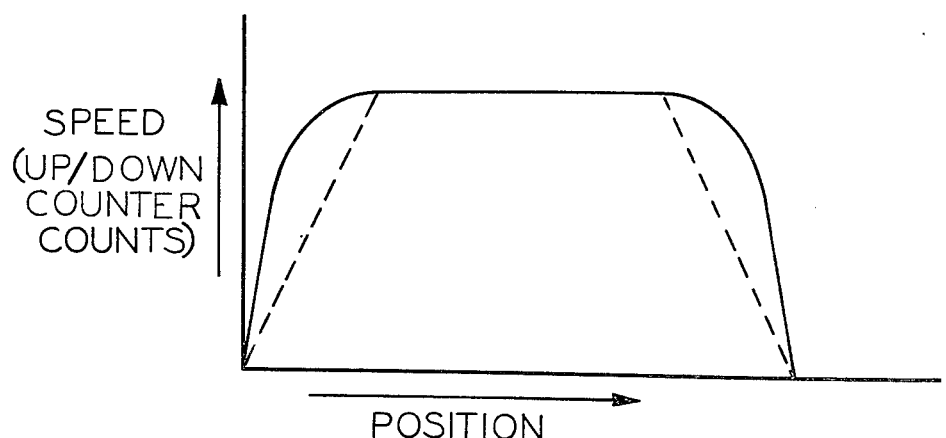
FIG. 4 is a graph showing speed vs. position for a stepping motor driven device under control of the present invention.

It will be helpful to an understanding of the invention to first refer to FIG. 4 which shows a desirable speed versus position curve for a movement of an element driven by a stepping motor over a single move. The plateau represents the maximum desired speed which may be established, for example, by the desired feed rate on the machine tool. Because it is necessary to maintain absolute position control the motor must be accelerated at a rate which is sufficiently low to avoid any slip. The dotted straight lines represent linear acceleration which, of course, requires constant accelerating force. The accelerating force is provided by the stepping motor torque but the torque available from the stepping motor decreases with increasing speed. Therefore to avoid exceeding the torque limit of the motor and slipping the straight line acceleration must be at a rate dictated by the relatively low torque available at relatively high speeds.

The solid curved line represents a more efficient acceleration with high acceleration at low speeds and lower acceleration at relatively high speeds. The system characteristics, except for the effect of friction, are substantially identical on deceleration (negative acceleration) as is reflected by symmetrical form of the graph.

In general terms the functions of the stepping motor control is to pulse the motor to drive it at the desired speed depending on position within the move while retaining absolute position control. For a short move there may be no "steady state" operation, only acceleration and deceleration. The "steady state" operation may be at an absolutely constant rate or may alternate between a speed just above and one just below the "steady state" level. For almost all applications either of these modes is equally acceptable. The latter is somewhat easier to implement with the present invention and therefor is preferred.

Turning now to FIG. 1 a high frequency voltage controlled oscillator (VCO) 10 is used to provide a signal controlling the maximum stepping rate. Preferably the circuit disclosed in the previously mentioned U.S. pat. application of Caludio de Sa e Silvia is used for this oscillator. A potentiometer 11 connected to an appropriate voltage source indicated as +E provides an input to the VCO 10 to permit operator range adjustment. A delay element 12 is provided to avoid the possibility of instantaneously dropping the oscillator rate because such action could result in attempting to decelerate the motor instantaneously which could result in loss of synchronization.

The output 13 of the VCO is a high frequency pulse train which provides synchronizer pulses to several points marked "sync" and numbered 13 in the system logic. The pulse train 13 is also fed into a digital ratio multiplier (also referred to in the art as a decimal rate multiplier or DRM) 14 where it is multiplied by a rate set digitally by the rate set 15. The output 16 of the DRM 14 is an irregular pulse train having an average frequency proportional to the desired maximum stepping frequency. To smooth out the irregularities in the pulse train 16 dividers 17 and 18 are provided. For reasons which will later be explained divider 17 is a programmable divider which divides by either 7 or 10 depending on whether line 19 or line 20 is energized.

The output of the second divider 18 is a pulse train at 21 which is at the maximum desired rate for pulsing the motors. The control logic compares the maximum rate signal with a ramp rate signal 22 and several other inputs and determines the rate of motor pulsing which is appropriate.

Following is a description of the portion of the circuit, shown in FIG. 2, which generates the ramp rate signal 22 and the other inputs to the control logic. The present invention preferably uses a microprocessor 23 as its central data handling means. The microprocessor 23 receives data stored in data storage element 24 which may be in the form of a programmable read only memory (PROM) and may contain several kinds of information for use in the overall system. As it relates to the present invention the information stored may be described as move information indicating the axis or axes of movement, the direction of movement on each axis, and the magnitude of movement. The circuitry described is capable of moving along two axes simultaneously only in equal increments driven by a single motor drive unit.

The move information is transferred from the date storage 24 to the microprocessor 23 and acted on as follows. The lowest order digits, preferably two, of the move distance instructions are transferred to (read into) a down counter 25 and the high order digits are retained in the microprocessor. The axis and direction commands are provided to motor drivers 26 which provide polarity changes to the windings of the motors 27 and 28 in accordance with the commands. Typically the motor drivers 26 are provided with means to scale the input pulses to provide a motor increment for each one, two, five or 10 control pulses. This allows compensation for varying mechanical systems while programming the controller simply in movement distances; e.g., thousandths of an inch.

An up/down counter 29 has an initial count of zero at the start of each move. Pulses are provided to the counter 29 on line 30 to increment or decrement it depending on the signal 31. Counter 29 has three outputs; 29a which is a digital representation of its count; 29b which indicates that it is in near overflow condition; and, 29c which indicates its count is zero. Outputs 29a and c can be provided, for example, by AND gating the highest order digits of 29a and NOR gating all of the digits of 29a respectively. Pulses are provided to the down counter 25 on line 32 and pulses are provided to the motor drivers 26 on the line 33. The manner of providing pulses will hereafter be described in detail but for purposes of understanding the operation of the circuit now under discussion it must be assumed that:

(1) Each pulse on the line 33 goes to the motor(s) to be driven;
(2) there is one pulse on line 30 to the up/down counter 29 for each pulse on line 33 to the motor;
(3) the signal on 31 is such that the counter 29 counts up when the motor pulse signal on 33 is accelerating and such that the counter 29 counts down when the signal on 33 is decelerating; and
(4) line 32 provides two pulses to counter 25 for each up count on counter 29 and one pulse to counter 25 for each signal on 33 which is neither accelerating or decelerating.

Down counter 25 is of the type which counts through zero and provides an output signal when it is at zero. Thus if it is the preferred two decimal digit counter it will go from "00" to "99." If it is a modulus two (binary) counter it will go, for example, from "0000" to "1111." It must be capable of counting down at system rates on the order of 350 Kc which is in excess of the rate at which microprocessors generally can add or subtract particularly when dealing with decimal numbers.

With a two decimal digit down counter 25, 350 Kc input pulses result in 3.5 Kc output pulses on the equals zero output 34 which is fed into the microprocessor 23 to accumulate for comparison against the high order digits stored therein. Down counter 25 and the microprocessor 23 therefore act together as a high speed counter. The equals zero outputs from the downcounter 25 is gathered with the equals zero signal on the line 35 from the microprocessor by the AND gate 36 thereby providing an output on line 37 at the completion of the count.

As mentioned up/down counter 29 increments for each step of acceleration and decrements for each step of deceleration (negative acceleration). Thus the count it carries indicates the net acceleration of the system within the move. This number in digital form is converted by digital to analog converter 38 into an analog voltage proportional on line 39 to the net acceleration. The output on 39 is fed into an amplifier 40 which can be adjusted to provide a variable slope to the acceleration curve; i.e., the curve in FIG. 4. The output 41 of the amplifier 40 is fed to a shaper circuit 42 which can be of any type adapted to the particular needs of the system. Preferably it takes the form of the aforementioned copending patent application to provide an input/output relationship corresponding to the curve of FIG. 4.

The output 43 of the shaper 44 is fed into a relatively low frequency voltage controlled oscillator 44 as the control voltage so that the output thereof (which is the previously described ramp rate signal 22) is a pulse train with a frequency equal to the desired rate of pulsing the motor drivers 26 during acceleration and deceleration. This rate also equals the rate of incrementing the motors if the drivers are set at a scaling factor of one. The oscillator 44 is preferably of the type disclosed in the aforementioned patent application and includes a grounding or similar means whereby it can be turned off by an inhibit signal on line 45.

Returning now to FIG. 1, the shaper input voltage 41 and the output of potentiometer 11 are feed into comparator 46 the function of which is to override a speed signal from the oscillator 44 and to prevent overfill of the up/down counter 29. The output 47 of the comparator 46 will be zero when the signal 46 is less than the control voltage from the potentiometer 11.

An OR gate 48 "gathers" the various signals which inhibit operation of the logic including signal 47, the previous mentioned main counter complete signal 37, near overflow signal 29b and other signals as desired for the particular application which may indicate, for example, that the control is not executing, the rate is too high, that the control is to be reset or that a "slide hold" function has been engaged. The output 49 of the OR gate 48 is fed into a further OR gate 50 where it is collected with any desired optional inputs to provide a signal 51 which indicates a condition in which deceleration is not to take place for example to inhibit deceleration for continuous path contouring.

Signal 49 is also fed to an inverting (not) input of OR gate 52. Inverting inputs on logic elements are consistently shown herein as small circles adjacent the logic element. The signal 29c indicating that the up/down counter 29 equals zero is also provided to an inverting input of the OR gate 52; consequently its output 53 indicates a condition in which deceleration is possible.

Line 53 is one of three signals provided to the input of AND gate 54. A second input is provided on line 45 which eminates from the output (Q connection) of the latch 55 which has at its C input the ramp rate pulse signal 22 and as its D input a steady positive voltage indicated as +E. Line 45 also provides the inhibit signal, previously mentioned, to the low frequency voltage controlled oscillator 44. The operation of the latch 55 (and the other latches hereinafter to be discussed) is that the signal on the D input is put and held (latched) on the Q output at such time as a positive signal transition is seen on the C input. The Q output is cleared (set to zero) when a positive signal is provided to the R (reset) input and set to a positive signal when a positive signal is provided to the P (preset) input. Thus a pulse on line 22 produces an output at Q on line 45 to inhibit the low frequency voltage controlled oscillator and to the AND gate 54. Similarly, latch 56 receives the maximum rate signal 21 on input C and a constant voltage +E on the D input and therefore provides a held positive output at Q on line 57 for any pulse from line 21 until reset. The signal on line 57 is gathered with the signals 45 and 55 in the AND gate 54 providing a positive signal on line 58 to the D input of latch 59. A synchronizing pulse from the output 13 of the high frequency voltage controlled oscillator 10 is applied to the C input of the latch 59 to gate the signal 58 to the Q output of the latch 59 on line 60. The presence of a signal 60 may be thought of as indicating the completion of the first step of a four step logic sequence illustrated in FIG. 3 as will hereinafter be discussed. Line 60 is connected to the reset inputs, R, on latches 55 and 56 to reset them to zero at the time of the first logic step.

A don't accelerate signal is generated on line 61 by the latch 62 which has as its reset signal, R, the output 49 of the OR gate 48 and as its present signal P the signal 29 C indicating that the up/down counter 29 equals zero. The gate input C to latch 62 is the maximum rate signal 21 and the signal input D thereof is the inhibit output 45 of latch 55 provided through a delay element 63. Thus there is a positive don't accelerate signal on 61 unconditionally when the up/down counter 29 equals zero and also upon the coincidence of a maximum rate signal on 21 and the continued existence (through the delay 63) of a ramp rate pulse on 22.

Returning now to FIG. 2, the don't decelerate signal on line 51, the first logic step signal on line 60 and the don't accelerate signal on line 61 provide the inputs to a logic network comprising AND gates 64 to 71, OR gates 72, 73 and 74 and latches 75, 76 and 77. The Q outputs of latches 75, 76 and 77 are identified, solely for convenience, as $Y_1$, $Y_2$ and $Y_3$, respectively.

Figure 3:
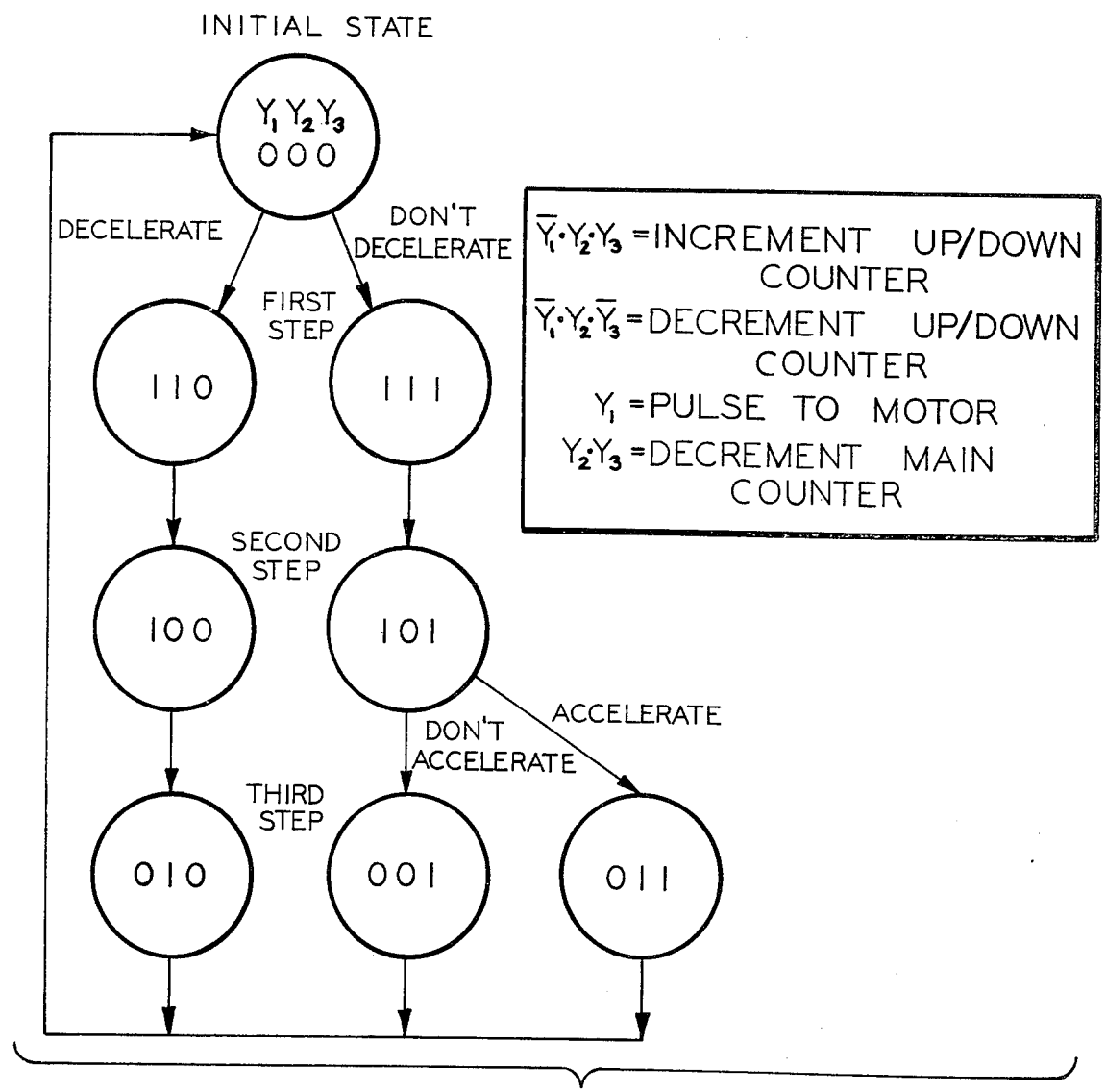
FIG. 3 is a step diagram useful in following the system logic.

FIG. 3 illustrates the operation of the logic circuitry as it steps through the four logic steps associated with each motor step using the $Y_1$, $Y_2$ and $Y_3$ designations previously described. The logic increments from step to step under the clock control of the synchronizer pulses.

Initially, $Y_1$, $Y_2$ and $Y_3$ are all zero as illustrated in the uppermost circle. if there is a don't decelerate signal on line 51 the logic steps down the right hand path to the 1, 1, 1 state (i.e., where $Y_1$, $Y_2$ and $Y_3$ are all positive); otherwise it steps down the left hand path to the 1, 1, 0 state. The left hand branch for deceleration proceeds stepwise with no additional decision branches through the 1, 0, 0 and 0, 1, 0 states and returns to the initial 0, 0, 0 state.

In the don't decelerate branch, the logic steps from the 1, 1, 1 state to the 1, 0, 1 state with no decision branch. In the subsequent step a further decision is made and the rightmost branch is following to the 0, 1, 1 state upon acceleration while the leftmost branch is followed to the 0, 0, 1 state for steady operation.

A $Y_1$ pulse on line 33 controls the motor drivers 26 to provide driving pulses to the motors 27 and 28 as well as providing a control signal to the logic. Because of the memory of the latch two successive steps each having a $Y_1 = 1$ state provide a single two logic step long pulse on 33 and to the motor(s). This occurs in the first two logic steps whether decelerating or not. Such a stretched pulse to the motor and logic is highly advantageous in some applications since many commonly used logic devices are not well suited for operation at the rates associated with single pulses on line 33.

A $Y_1$ (not Y), and a $Y_2$ in combination provide a pulse to the up/down counter 29 which is counted up if $Y_3 = 1$ and counted down if $Y_3 = 0$ ($\bar{Y}_3$). Thus the up/down counter is incremented once for each acceleration step, decremented once for each deceleration step and not counted for each steady state step. The $Y_1$ and $Y_2$ signals are gathered by AND gate 70 to provide counting pulses on line 30 to the up/down counter 29 and $Y_3$ is provided on line 31 to the up/down control input of the counter 29 as previously described to effect the desired counting.

$Y_2$ and $Y_3$ are gathered by AND gate 71 to provide a pulse on line 32 to count down the main down counter 25. As seen in FIG. 3, the deceleration path includes no $Y_2$, $Y_3$ and, consequently, no pulses are provided to counter 25 on deceleration. A $Y_2$, $Y_3$ pulse is provided in the first step of the don't decelerate path and also in the third step of the accelerate path. Therefore the main counter is counted down by one for each motor step in the steady state mode and by two for each acceleration step.

As disclosed herein the circuit provides the don't decelerate signal on line 51 to control the branching decision at the first logic step via AND gate 69, OR gate 74 and latch 77. The don't accelerate signal on line 61 controls the third step branching decision in the don't accelerate path and is provided unconditionally when the up/down counter 29 equals zero and conditionally when the ramp rate signal 22 is of a higher frequency than the maximum rate signal; i.e., when a ramp rate pulse on 22 is latched onto the Q output of latch 55 (thereby inhibiting a further pulse from the low frequency voltage controlled oscillator) and the D input of the latch 62 through the delay 63 before a maximum rate pulse on line 21 set to the latch 62. Consequently, with the present circuit the system will normally be always accelerating or decelerating over a very small increment of speed difference expect when the up/down counter 29 equals zero. Although such precision is seldom required, the control logic is, however, equally adapted to hold a steady state speed if desired. For example, a circuit, not shown, can be provided to provide a positive signal to the P input of latch 62 if the ramp rate signal 22 and the maximum rate signal 21 were substantially equal.

As previously mentioned, the basic logic and circuitry of the present invention is highly flexible and can be used with a variety of optional features. One such feature is the ability to maintain velocity of the element controlled by the motors 27 and 28 constant. This is done by providing the motor drivers 26 with appropriate signals on line 80 from microprocessor 23 to indicate which one of the motors 27 and 28 are to be driven for a particular move or if the move requires driving both motors simultaneously. If either motor alone is to be driven a signal is also provided by the microprocessor 23 on line 19 to cause the programmable divider 17 to divide by 7. If both motors are to be driven simultaneously, a signal is provided on line 20 to cause the divider 17 to divide by 10. Thus the controlling maximum rate signal 21 varies by a factor approximately $\sqrt{2}$ depending on whether one of two motors are driven simultaneously thereby maintaining the resultant maximum velocity of the part to be moved substantially constant. This provision of a means to vary the maximum pulse rate by approximately $\sqrt{2}$ interposed between the oscillator 10 and the motors 27 and 28 substantially simplifies prior art devices which have required specific rate calculations and/or relatively elaborate means to modify oscillator frequencies. This pulse rate correction is preferably done on a step by step basis thereby correcting continuously for rate variations due to the individual versus combined axis steps.

The controls herein disclosed are capable of many modifications to suit the needs of individual applications. The foregoing description is intended as illustrative and not limiting, the protection hereof being defined solely by the spirit and scope of the following claims.

What is claimed is:

1. A speed rate control for driving a stepping motor in response to pulses over a predetermined distance expressed in steps comprising:
   (a) a first counting means for initially storing the number of steps to be taken;
   (b) second counting means comprising an up/down counter;
   (c) maximum speed signal input providing a signal related to the maximum desired speed of driving the motor;
   (d) acceleration speed signal generating means providing an output signal which relates to the instantaneous desired speed of the motor and varies with the count in the second counter;
   (e) means comparing the acceleration speed signal with the maximum speed signal and generating control signals according to the following:
      (i) when the count in the first counter is above one and the desired speed is below the maximum speed to provide single pulses to the motor and to up-count the second counter and two pulses for each pulse to the motor to downcount the first counter;
      (ii) when the count in the first counter is exactly one to provide a single pulse to the motor, no pulses to the second counter and one pulse to downcount the first counter;
      (iii) when the count in the first counter is zero and also when the desired speed is greater than the maximum speed to provide single pulses to the motor and a single pulse to downcount the second counter for each pulse to the motor and no pulses to the first counter.

2. The control of claim 1 wherein said maximum speed signal input comprises a variable voltage source and a voltage controlled oscillator.

3. The control of claim 2 wherein a delay means is interposed between the variable voltage source and the voltage controlled oscillator.

4. The control of claim 2 further including a digital rate input means and a digital rate multiplier connected thereto and to the output of said voltage controlled oscillator.

5. The control of claim 4 wherein a delay means is interposed between the variable voltage source and the voltage controlled oscillator.

6. The control of claim 1 wherein said acceleration speed signal generating means comprises a digital to analog converter having its digital input connected to the output of said second counting means and a voltage controlled oscillator connected to the output of said digital to analog converter.

7. The control of claim 6 further including a shaping circuit interposed between the output of said digital to analog converter and the input of said voltage controlled oscillator.

8. The control of claim 6 wherein said maximum speed signal input comprises a variable voltage source and a voltage controller oscillator.

9. The control circuit of claim 8 wherein a delay means is interposed between the variable voltage source and the voltage controlled oscillator.

10. The control of claim 8 further including a digital rate input means and a digital rate multiplier connected thereto and to the output of said voltage controlled oscillator.

11. The control of claim 10 wherein a delay means is interposed between the variable voltage source and the voltage controlled oscillator.

* * * * *